(12) United States Patent
Nagae et al.

(10) Patent No.: US 7,717,099 B2
(45) Date of Patent: May 18, 2010

(54) EXHAUST GAS RECIRCULATION DEVICE OF INTERNAL COMBUSTION ENGINE, AND CONTROL METHOD THEREOF

(75) Inventors: Masahiro Nagae, Aichi-ken (JP); Hajime Shimizu, Susono (JP); Hiroki Murata, Gotenba (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 12/306,759

(22) PCT Filed: Jun. 27, 2007

(86) PCT No.: PCT/IB2007/001742

§ 371 (c)(1),
(2), (4) Date: Jan. 23, 2009

(87) PCT Pub. No.: WO2008/001194

PCT Pub. Date: Jan. 3, 2008

(65) Prior Publication Data

US 2009/0194079 A1 Aug. 6, 2009

(30) Foreign Application Priority Data

Jun. 29, 2006 (JP) .............................. 2006-179768

(51) Int. Cl.
*F02B 47/08* (2006.01)
*F02M 25/07* (2006.01)
(52) U.S. Cl. .............................. 123/568.21; 123/559.1; 60/600
(58) Field of Classification Search ............ 123/568.11, 123/568.12, 568.18, 568.21, 559.1; 60/600, 60/602, 605.1
See application file for complete search history.

(56) References Cited

U.S. PATENT DOCUMENTS

| 4,215,550 | A * | 8/1980 | Dinger et al. ................. 60/606 |
| 6,945,236 | B2 * | 9/2005 | Nakai et al. ............ 123/568.12 |
| 7,043,914 | B2 * | 5/2006 | Ishikawa .................... 60/605.2 |
| 7,131,271 | B2 * | 11/2006 | Bulicz et al. ............... 60/605.2 |
| 7,207,311 | B2 * | 4/2007 | Chmela et al. .............. 123/305 |
| 7,343,742 | B2 * | 3/2008 | Wimmer et al. ............ 60/605.2 |
| 7,469,691 | B2 * | 12/2008 | Joergl et al. ............. 123/568.12 |
| 2006/0048744 | A1 * | 3/2006 | Castagne et al. ............ 123/305 |
| 2007/0125081 | A1 * | 6/2007 | Czarnowski et al. .......... 60/599 |
| 2007/0251235 | A1 * | 11/2007 | Schmid et al. ............. 60/605.2 |
| 2008/0041051 | A1 * | 2/2008 | Silbermann et al. ........ 60/605.2 |
| 2009/0000297 | A1 * | 1/2009 | Joergl et al. ................ 60/605.3 |
| 2009/0038308 | A1 * | 2/2009 | Nagae ........................ 60/602 |

(Continued)

FOREIGN PATENT DOCUMENTS

EP 1 234 966 A2 8/2002

(Continued)

*Primary Examiner*—Hai H Huynh
(74) *Attorney, Agent, or Firm*—Sughrue Mion, PLLC

(57) ABSTRACT

An exhaust gas recirculation device includes a turbocharger (5) having a turbine (5b) on an exhaust pipe (4) and a compressor (5a) on an intake pipe (3), a low-pressure EGR passage (31) connecting the exhaust pipe (4) downstream of the turbine (5b) and the intake pipe (3) upstream of the compressor (5a), and a filter (13) provided on the exhaust pipe (4) downstream of the turbine (5b). In the device, an exhaust throttle valve (19) is disposed on the exhaust pipe (4) that is downstream of the filter (13) and that is upstream of a site of connection with the low-pressure EGR passage (31).

10 Claims, 4 Drawing Sheets

U.S. PATENT DOCUMENTS

| | | | |
|---|---|---|---|
| 2009/0063023 A1* | 3/2009 | Nagae | 701/108 |
| 2009/0071150 A1* | 3/2009 | Joergl et al. | 60/605.2 |
| 2009/0133385 A1* | 5/2009 | Ono | 60/277 |
| 2009/0223221 A1* | 9/2009 | Onishi et al. | 60/603 |

FOREIGN PATENT DOCUMENTS

| | | |
|---|---|---|
| EP | 1 455 078 A1 | 9/2004 |
| JP | 2002-276405 A | 9/2002 |
| JP | 2003-343287 A | 12/2003 |
| JP | 2004-150319 A | 5/2004 |
| JP | 2006-336547 A | 12/2006 |
| WO | 2005/003536 A1 | 1/2005 |

* cited by examiner

EXHAUST GAS RECIRCULATION DEVICE OF INTERNAL COMBUSTION ENGINE, AND CONTROL METHOD THEREOF

BACKGROUND OF THE INVENTION

1. Field of the Invention

The invention relates to an exhaust gas recirculation device of an internal combustion engine, and a control method thereof.

2. Description of the Related Art

A known technology of reducing the amount of NOx contained in exhaust gas from an internal combustion engine is an EGR technology that recirculates a portion of exhaust gas to an intake passage. For example, Japanese Patent Application Publication No. JP-A-2004-150319 discloses an exhaust gas recirculation device of an internal combustion engine which includes a low-pressure EGR passage connecting an exhaust passage downstream of a turbine of a turbocharger and an intake passage upstream of a compressor of the turbocharger, and a high-pressure EGR passage connecting the exhaust passage upstream of the turbine and the intake passage downstream of the compressor, and which performs an EGR control by switching between the low-pressure EGR passage and the high-pressure EGR passage or using both EGR passages in accordance with the state of operation of the internal combustion engine.

In conjunction with an internal combustion engine equipped with a particulate filter (hereinafter, referred to as "filter") that traps particulate matter (hereinafter, referred to as "PM") contained in exhaust gas from the internal combustion engine, there is a known technology that removes the deposit of PM from the filter by oxidation in a forced fashion by raising the temperature of exhaust gas that flows into the filter (this process will be hereinafter referred to as "regeneration process") if the amount of PM deposited on the filter is greater than or equal to a predetermined amount.

For example, Japanese Patent Application Publication No. JP-A-2003-343287 discloses a technology that performs the regeneration process of the filter through the temperature raise of exhaust gas from the internal combustion engine which is achieved by closing an exhaust throttle valve provided in an exhaust passage downstream of the filter so as to raise the back pressure in the exhaust passage upstream of the exhaust throttle valve and therefore increase the load of the internal combustion engine.

The exhaust gas recirculation device of an internal combustion engine equipped with an exhaust purification device, such as a filter or the like, generally has a construction in which the low-pressure EGR passage is connected to the exhaust passage downstream of the exhaust purification device, and an exhaust throttle valve is disposed in the exhaust passage downstream of the site of branching to the low-pressure EGR passage.

In this construction, for example, if the exhaust throttle valve is operated in the closing direction in order to execute the regeneration process of the filter, the pressure in the low-pressure EGR passage rises with the rise in the back pressure in the exhaust passage at the upstream side of the exhaust throttle valve. Therefore, there is a possibility that the adjusting accuracy of a flow amount regulator valve provided on the low-pressure EGR passage will decline and therefore the amount of EGR gas recirculated via the low-pressure EGR passage will become excessively large or small. Therefore, generally in the related-art exhaust gas recirculation device having a construction as described above, the recirculation of exhaust gas via the low-pressure EGR passage is stopped during the execution of the regeneration process of the filter.

In this case, however, during the regeneration process of the filter, there is a possibility that sufficient amount of EGR gas cannot be supplied to the internal combustion engine and therefore the amount of NOx emission will increase. Conversely, during a state of engine operation that requires large amount of EGR, there is also a possibility that the execution of the regeneration process of the filter will become impossible and therefore an excessive amount of PM will deposit on the filter and will degrade fuel economy.

This problem can possibly occur not only in the case where the exhaust throttle valve is closed at the time of the regeneration process of the filter, but also in, for example, the case where the exhaust throttle valve is closed at the time of quick warm-up of a catalyst, the case where the exhaust throttle valve is closed in order to operate an exhaust brake, etc.

SUMMARY OF THE INVENTION

In an exhaust gas recirculation device having a low-pressure EGR passage and a control method thereof, the invention makes it possible to suitably accomplish the control of the degree of opening of the exhaust throttle valve and the control of EGR via the low-pressure EGR passage at the same time while securing good degrees of freedom of the two controls.

An exhaust gas recirculation device of an internal combustion engine in a first aspect of the invention includes a turbocharger having a turbine on an exhaust passage of the internal combustion engine and a compressor on an intake passage of the internal combustion engine, a low-pressure EGR passage connecting the exhaust passage downstream of the turbine and the intake passage upstream of the compressor, and an exhaust throttle valve that is provided on the exhaust passage upstream of a site of connection with the low-pressure EGR passage and that changes a channel cross-sectional area of the exhaust passage.

According to this construction, since the low-pressure EGR passage is connected to the exhaust passage downstream of the exhaust throttle valve, the variation in the back pressure in the exhaust passage at the upstream side of the exhaust throttle valve becomes less likely to affect the pressure in the low-pressure EGR passage even when the degree of opening of the exhaust throttle valve is changed.

For example, in the case where the exhaust throttle valve is operated in the closing direction, the back pressure in the exhaust passage upstream of the exhaust throttle valve rises, but this rise in the back pressure is not accompanied by a rise in the pressure in the low-pressure EGR passage. Hence, the recirculation of exhaust gas via the low-pressure EGR passage can be controlled in substantially the same manner as in the case where the exhaust throttle valve is not operated in the closing direction.

Thus, according to the foregoing construction, it is possible to restrain or substantially avoid an event that one of the control of the degree of opening of the exhaust throttle valve and the control of recirculation of exhaust gas via the low-pressure EGR passage is affected by the other one of the controls. That is, regardless of the control of the degree of opening of the exhaust throttle valve, the control of recirculation of exhaust gas via the low-pressure EGR passage can be performed.

Examples of the case where the degree of opening of the exhaust throttle valve is changed include the case where the exhaust throttle valve is operated in the closing direction when the exhaust brake is used as an auxiliary brake. In the construction where the low-pressure EGR passage is connected to the exhaust passage upstream of the exhaust throttle valve as in the related art, the rise in the back pressure in the exhaust passage upstream of the exhaust throttle valve during operation of the exhaust brake is accompanied by a rise in the pressure in the low-pressure EGR passage, so that sometimes the recirculation of exhaust gas via the low-pressure EGR passage cannot be suitably performed.

In contrast, according to the first aspect of the invention, during operation of the exhaust brake, the pressure in the low-pressure EGR passage connected to the exhaust passage downstream of the exhaust throttle valve does not greatly vary. Therefore, it is possible to recirculate a requested amount of EGR gas to the intake passage by controlling the recirculation of exhaust gas via the low-pressure EGR passage in substantially the same manner as in the case where the exhaust brake is not operated.

If the invention is applied to a construction in which a post-treatment of exhaust gas by an exhaust purification device, for example, the removal of particulate matter (PM) from exhaust gas, or the oxidation/reduction reactions of unburned fuel (HC, CO, etc.), nitrogen oxides (NOx), exhaust-added fuel, etc., is performed, the exhaust passage downstream of the turbine and upstream of the exhaust throttle valve in the first aspect of the invention may be provided with an exhaust purification device.

In an internal combustion engine having an exhaust purification device as described above, the exhaust throttle valve, in some cases, is controlled on the basis of a request related to the post-treatment of exhaust gas by the exhaust purification device. However, in the related-art construction, since the variation in the back pressure in the exhaust passage upstream of the exhaust throttle valve at the time of control of the exhaust throttle valve affects the pressure in the low-pressure EGR passage, there are cases in which the request for the post-treatment of exhaust gas and the request for the EGR via the low-pressure EGR passage cannot be fulfilled at the same time.

There are cases where the exhaust throttle valve is operated in the closing direction, for example, for the purpose of rapidly raising the temperature of the filter or the catalyst. In such a case, the related-art construction undergoes a rise in the pressure in the low-pressure EGR passage, so that it is sometimes inevitable to stop the EGR via the low-pressure EGR passage.

In contrast, according to the first aspect of the invention, excessive rise in the pressure in the low-pressure EGR passage is restrained even when the degree of opening of the exhaust throttle valve is changed in the closing direction. Therefore, even when the exhaust throttle valve is operated in the closing direction in order to rapidly raise the temperature of the filter or the catalyst, it is possible to perform the recirculation of exhaust gas via the low-pressure EGR passage so as to recirculate a requested amount of EGR gas to the intake passage.

In the first aspect of the invention, the exhaust gas recirculation device may further include a low-pressure EGR valve that is provided on the low-pressure EGR passage and that changes the channel cross-sectional area of the low-pressure EGR passage; and EGR control means for controlling the low-pressure EGR valve so that an amount of exhaust gas that is recirculated to the intake passage via the low-pressure EGR passage (hereinafter, also referred to as "low-pressure EGR gas") reaches a predetermined target amount. In this construction, the EGR control means may control the low-pressure EGR valve so that the amount of low-pressure EGR gas reaches the predetermined target amount when a degree of opening of the exhaust throttle valve is controlled in a closing direction.

The predetermined target amount is the amount of low-pressure EGR gas that is determined on the basis of, for example, the operating condition of the internal combustion engine or a requirement from the emission regulation values regarding PM NOx, etc., and is determined beforehand.

In general, the accuracy in the adjusting of the low-pressure EGR gas by the low-pressure EGR valve declines as the pressure in the low-pressure EGR passage becomes excessively high. Therefore, if the EGR control via the low-pressure EGR passage is executed while the pressure in the low-pressure EGR passage is excessively high, there is a possibility that the low-pressure EGR gas amount becomes excessively larger or excessively smaller than a target amount.

Therefore, in the related-art exhaust gas recirculation device constructed so that low-pressure EGR gas is extracted from the exhaust passage upstream of the exhaust throttle valve, it is sometimes inevitable to stop the EGR via the low-pressure EGR passage by fully closing the low-pressure EGR valve when the pressure in the low-pressure EGR passage becomes excessively high as the back pressure in the exhaust passage rises upon operation of the exhaust throttle valve in the closing direction.

In contrast, according to the first aspect of the invention, even when the back pressure in the exhaust passage upstream of the exhaust throttle valve rises upon operation of the exhaust throttle valve in the closing direction, excessive rise in the pressure in the low-pressure EGR passage in association with the rise in the exhaust passage upstream of the exhaust throttle valve is restrained.

Therefore, since the accuracy in the adjusting of the low-pressure EGR gas by the low-pressure EGR valve does not decline even when the exhaust throttle valve is controlled in the closing direction, the adjusting of the low-pressure EGR gas by the low-pressure EGR valve can be suitably performed so that the low-pressure EGR gas amount becomes equal to the target amount. That is, the control of the EGR via the low-pressure EGR passage can be performed without being restricted by the control of the degree of opening of the exhaust throttle valve.

The first aspect of the invention can be applied to an internal combustion engine that includes, as an exhaust purification device, a filter that traps PM from exhaust gas.

In general, the filter is loaded with a catalyst that has an oxidizing capability, and the PM trapped by and deposited on the filter is removed by oxidation due to the effect of the catalyst during a state of engine operation (e.g., a high-load operation) during which the temperature of the exhaust gas that flows into the filter becomes high. However, if a state of operation where this so-called continuous regeneration of the PM filter cannot be performed continues and the amount of PM deposited on the filter exceeds a permissible amount, a temperature raising process of raising the temperature of the filter in a forced fashion is executed to perform the regeneration process of removing the PM deposit by oxidation.

As concrete means for carrying out the regeneration process, an internal combustion engine is equipped with filter regeneration means that adopts a method in which by closing the exhaust throttle valve, the back pressure is raised and the load of the internal combustion engine is increased, so that the temperature of exhaust gas is raised. If in such an internal combustion engine, the low-pressure EGR passage is connected to the exhaust passage upstream of the exhaust throttle valve as in the related-art construction, the pressure in the low-pressure EGR passage rises simultaneously with rise in the back pressure in the exhaust passage when the exhaust throttle valve is closed in order to carry out the regeneration process of the filter. Thus, in some cases, the EGR control via the low-pressure EGR passage cannot be carried out, as mentioned above.

Therefore, while the regeneration process of the filter is being executed, the low-pressure EGR cannot be performed. Furthermore, there is another restriction that when it is difficult to stop the low-pressure EGR during a state of operation that requires a large amount of EGR, the filter regeneration process cannot be executed.

However, if the first aspect of the invention is applied to the internal combustion engine equipped with the filter regeneration means, excessive rise in the pressure in the low-pressure EGR passage is restrained even when the filter regeneration means controls the exhaust throttle valve in the closing direction so as to execute the regeneration process. Therefore, decline of the accuracy in the adjusting of the low-pressure EGR gas by the low-pressure EGR valve is restrained, so that it becomes possible to perform the EGR control while suitably controlling the low-pressure EGR gas amount to the target amount.

The first aspect of the invention can be applied to an internal combustion engine that includes, as an exhaust purification device, an exhaust purification catalyst that has an oxidation/reduction capability with respect to unburned fuel fractions in exhaust gas, such as hydrocarbon (HC), carbon monoxide (CO), etc., as well as added fuel provided by an exhaust fuel addition process, nitrogen oxides (NOx), sulfur oxides (SOx), etc.

In general, the catalyst needs to activate in order to suitably bring out its oxidation capability and its reduction capability. Various conditions for activating the catalyst are conceivable. However, in general, the catalyst is activated by raising the catalyst bed temperature to or above a predetermined activation temperature.

Therefore, when the temperature of the catalyst is low, for example, during the cold startup of the internal combustion engine, or the like, a catalyst warm-up process of raising the temperature of the catalyst in a forced fashion is sometimes performed for the purpose of activating the catalyst as quickly as possible.

In an internal combustion engine that includes, as concrete means for performing the catalyst warm-up, catalyst warm-up means that adopts a method in which the exhaust throttle valve is controlled in the closing direction similarly to the filter regeneration means, it is difficult to perform both the catalyst warm-up and the EGR control via the low-pressure EGR passage at the same time if the construction of the related-art exhaust gas recirculation device is used, as mentioned above.

However, according to the first aspect of the invention, even when the exhaust throttle valve is controlled in the closing direction, the EGR control via the low-pressure EGR passage can be suitably executed since decline in the adjusting accuracy of the low-pressure EGR valve can be restrained.

A second aspect of the invention is a control method of an internal combustion engine in conjunction with the exhaust gas recirculation device of the first aspect, the control method comprising: controlling the low-pressure EGR valve so that the amount of exhaust gas that is recirculated to the intake passage via the low-pressure EGR passage reaches a predetermined target amount when a degree of opening of the exhaust throttle valve is controlled in a closing direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Embodiments for carrying out the invention will be described in detail in an exemplary fashion with reference to the drawings. The sizes, materials, shapes, relative arrangements, and the like of component parts mentioned in conjunction with the embodiments are not intended to limit the technical scope of the invention only to the scope defined by those features and the like of the component parts unless a particularly specific description is provided.

Figure 1:
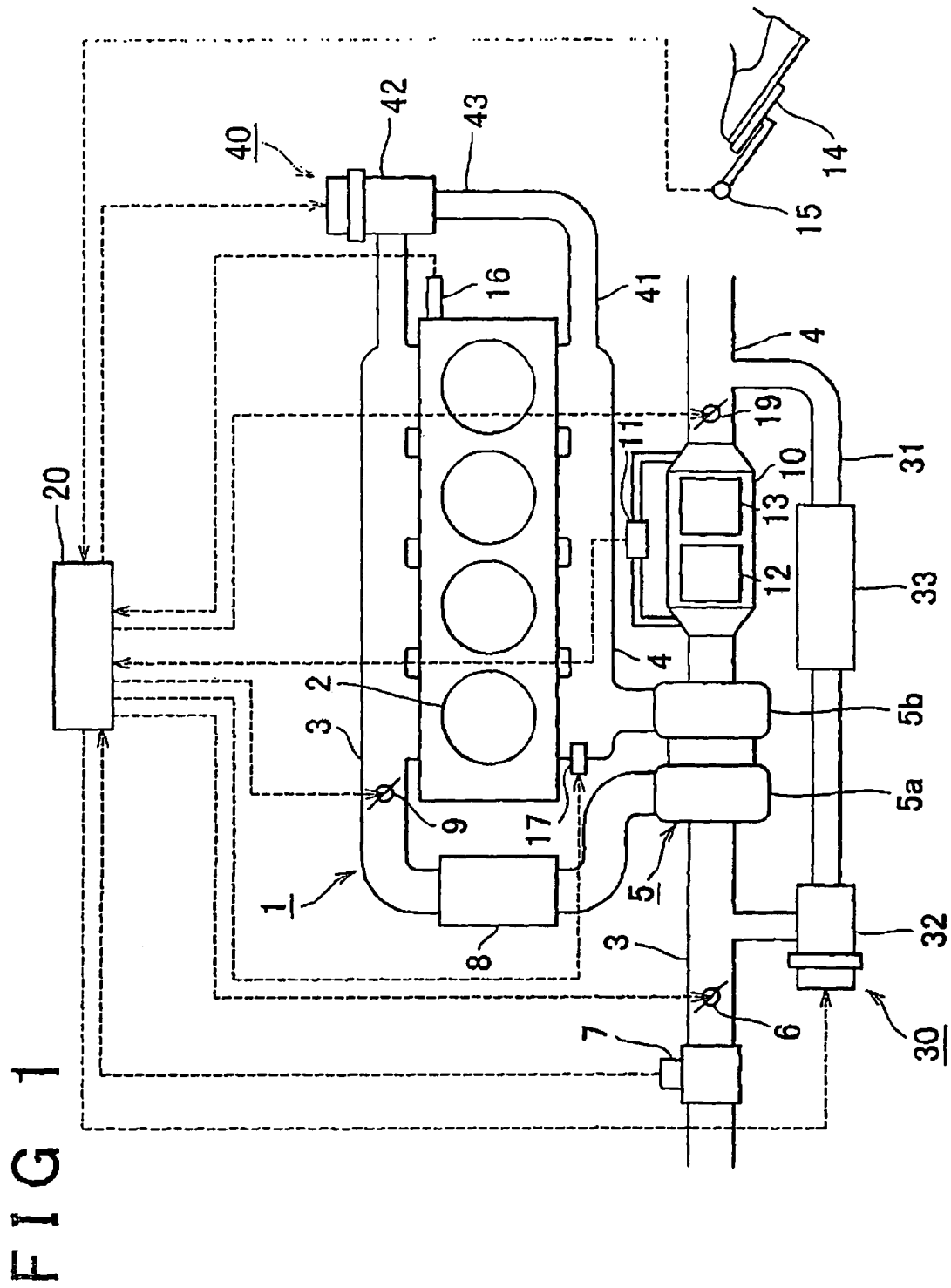
FIG. 1 is a schematic diagram showing a construction of an internal combustion engine and an intake system and an exhaust system thereof to which an exhaust gas recirculation device in accordance with an embodiment is applied.

FIG. 1 is a schematic diagram showing a construction of an internal combustion engine and an intake system and an exhaust system thereof to which an exhaust gas recirculation device in accordance with an embodiment is applied. An internal combustion engine 1 shown in FIG. 1 is a water-cooled four-stroke diesel engine that has four cylinders 2.

An intake pipe 3 and an exhaust pipe 4 are connected to the internal combustion engine 1. An intermediate portion of the intake pipe 3 is provided with a second intake throttle valve 9 that adjusts the amount of flow of intake air that flows in the intake pipe 3. The second intake throttle valve 9 is opened and closed by an electric actuator. The intake pipe 3 upstream of the second intake throttle valve 9 is provided with an intercooler 8 that allows heat exchange between intake air and external air.

The intake pipe 3 upstream of the intercooler 8 is provided with a compressor housing 5a of a turbocharger 5 that operates using energy of exhaust gas as a drive source. The intake pipe 3 upstream of the compressor housing 5a is provided with a first intake throttle valve 6 that adjusts the amount of flow of intake air that flows in the intake pipe 3. The first throttle valve 6 is opened and closed by an electric actuator.

The intake pipe 3 upstream of the first throttle valve 6 is provided with an air flow meter 7 that outputs a signal corresponding to the amount of flow of intake air that flows in the intake pipe 3. Using the air flow meter 7, an intake air amount of the internal combustion engine 1 is measured.

On the other hand, an intermediate portion of the exhaust pipe 4 is provided with a fuel addition valve that adds fuel into the exhaust gas that flows in the exhaust pipe 4. The exhaust pipe 4 downstream of the fuel addition valve 17 is provided with a turbine housing 5b of the turbocharger 5. The exhaust pipe 4 downstream of the turbine housing 5b is provided with an exhaust purification device 10.

The exhaust purification device 10 has an oxidation catalyst 12, a particulate filter (hereinafter, referred to as "filter") 13 that is provided at a stage subsequent to the oxidation catalyst 12. The filter 13 is loaded with a storage reduction NOx catalyst (hereinafter, referred to as "NOx catalyst").

The filter 13 traps particulate matter (hereinafter, referred to as "PM") from exhaust gas. The NOx catalyst stores nitrogen oxides (NOx) from exhaust gas when the oxygen concentration in exhaust gas that flows into the NOx catalyst is high, and the NOx catalyst releases stored NOx when the oxygen concentration in exhaust gas that flows into the NOx catalyst becomes low. At that time, if a reducing component, such as hydrocarbon (FTC), carbon monoxide (CO), etc., exists in exhaust gas, the NOx released from the NOx catalyst is reduced.

A differential pressure sensor 11 that measures the differential pressure between an upstream side and a downstream side of the filter 13 is attached to the filter 13. On the basis of the value detected by the differential pressure sensor 11, the amount of particulate matter (hereinafter, also referred to as "PM") deposited on the filter 13 can be detected. The exhaust pipe 4 downstream of the exhaust purification device 10 is provided with an exhaust throttle valve 19 that adjusts the amount of flow of exhaust gas that flows in the exhaust pipe 4. The exhaust throttle valve 19 is opened and closed by an electric actuator.

The internal combustion engine 1 is equipped with a low-pressure EGR device 30 that recirculates a portion of the exhaust gas that flows in the exhaust pipe 4 to the intake pipe 3 at low pressure. The low-pressure EGR device 30 includes a low-pressure EGR passage 31, a low-pressure EGR valve 32, and a low-pressure EGR cooler 33.

The low-pressure EGR passage 31 connects the exhaust pipe 4 downstream of the exhaust throttle valve 19 and the intake pipe 3 that is upstream of the compressor housing 5a and downstream of the first intake throttle valve 6. Through the low-pressure EGR passage 31, exhaust gas is recirculated at low pressure. In this embodiment, the exhaust gas recirculated through the low-pressure EGR passage 31 is termed low-pressure EGR gas.

The low-pressure EGR valve 32 adjusts the amount of low-pressure EGR gas that flows through the low-pressure EGR passage 31 by changing the channel cross-sectional area of the low-pressure EGR passage 31. The low-pressure EGR cooler 33 lowers the temperature of the low-pressure EGR gas by allowing heat exchange between the low-pressure EGR gas passing through the low-pressure EGR cooler 33 and the cooling water of the internal combustion engine 1.

Furthermore, the internal combustion engine 1 is equipped with a high-pressure EGR device 40 that recirculates a portion of the exhaust gas that flows in the exhaust pipe 4 to the intake pipe 3 at high pressure. The high-pressure EGR device 40 includes a high-pressure EGR passage 41, a high-pressure EGR valve 42, and a high-pressure EGR cooler 43.

The high-pressure EGR passage 41 connects the exhaust pipe 4 at the upstream side of the turbine housing 5b and the intake pipe 3 downstream of the second intake throttle valve 9. Through the high-pressure EGR passage 41, exhaust gas is recirculated at high pressure. In this embodiment, the exhaust gas recirculated through the high-pressure EGR passage 41 is termed high-pressure EGR gas.

The high-pressure EGR valve 42 adjusts the amount of high-pressure EGR gas that flows through the high-pressure EGR passage 41 by changing the channel cross-sectional area of the high-pressure EGR passage 41. The high-pressure EGR cooler 43 lowers the temperature of the high-pressure EGR gas by allowing heat exchange between the high-pressure EGR gas passing through the high-pressure EGR cooler 43 and the cooling water of the internal combustion engine 1.

The internal combustion engine 1 constructed as described above is provided with an ECU 20 that is an electronic control unit for controlling the internal combustion engine 1. The ECU 20 is a computer that controls the state of operation of the internal combustion engine 1 in accordance with the operating condition of the internal combustion engine 1 and a request of a driver.

Besides the aforementioned differential pressure sensor 11, other sensors are also connected to the ECU 20 via electric wiring, including an accelerator operation amount sensor 15 that outputs an electric signal corresponding to the amount of depression of an accelerator pedal 14 caused by the driver and that is capable of detection of the engine load, and a crank position sensor 16 that detects the engine rotation speed. The output signals of theses various sensors are input to the ECU 20.

Furthermore, the first intake throttle valve 6, the second intake throttle valve 9, the low-pressure EGR valve 32, the high-pressure EGR valve 42, and the fuel addition valve 17 are connected to the ECU 20 via electric wiring, and these appliances are controlled by the ECU 20.

Now, the recirculation of exhaust gas performed through the use of the low-pressure EGR device 30 and the high-pressure EGR device 40 in this embodiment will be described. As for the recirculation of exhaust gas performed by the low-pressure EGR device 30 and the recirculation of exhaust gas performed by the high-pressure EGR device 40, the operating conditions of the internal combustion engine that allow the recirculation of exhaust gas to be suitably performed are empirically found beforehand respectively for the EGR devices. In this embodiment, the recirculation of exhaust gas is performed by switching between the low-pressure EGR device 30 and the high-pressure EGR device 40 or using both the devices in accordance with the state of operation of the internal combustion engine.

Figure 2:
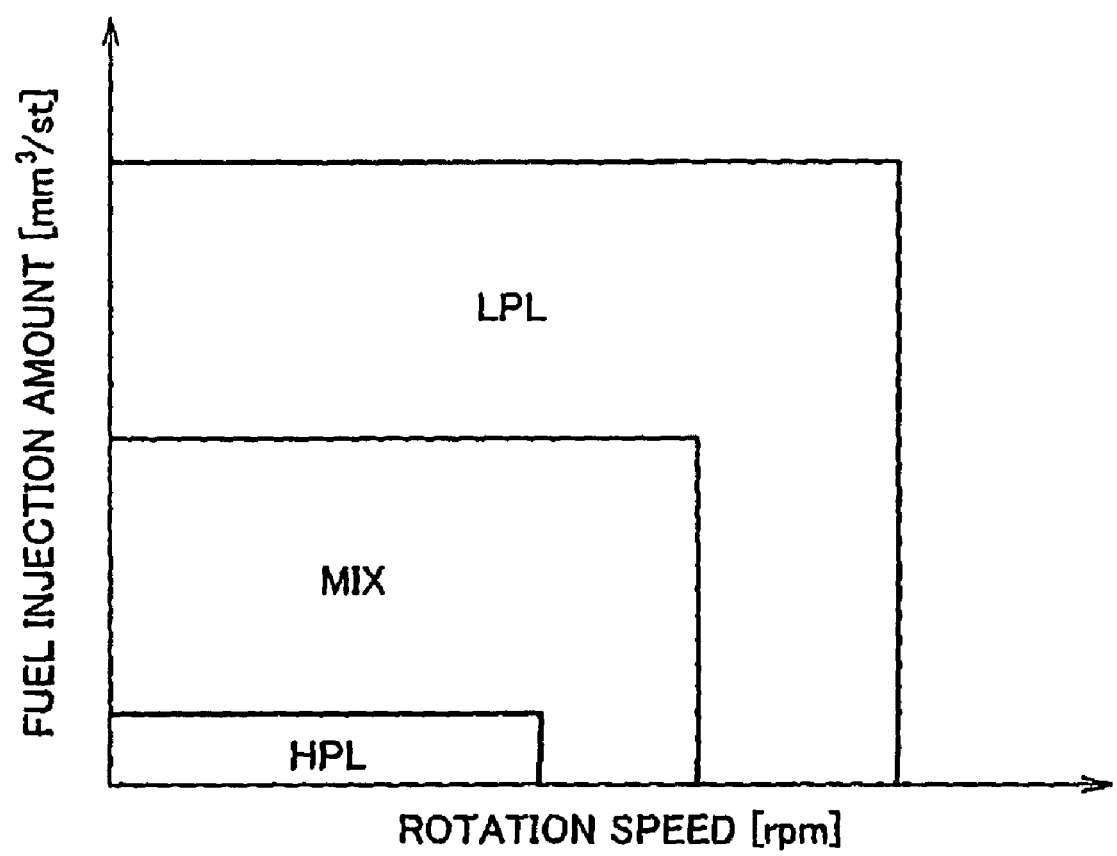
FIG. 2 is a diagram showing a map of the switching between a low-pressure EGR device and a high-pressure EGR device in the embodiment.

FIG. 2 is a diagram showing a pattern of the switching between the low-pressure EGR device 30 and the high-pressure EGR device 40 which is determined depending on individual regions of the state of operation of the internal combustion engine 1. In FIG. 2, the horizontal axis represents the engine rotation speed of the internal combustion engine 1, and the vertical axis represents the engine load (fuel injection amount) of the internal combustion engine 1.

In FIG. 2, a region HPL is a region of the state of operation of the internal combustion engine 1 in which the load is low and the rotation speed is low. In this region, the recirculation of exhaust gas is performed by the high-pressure EGR device 40. A region MIX in FIG. 2 is a region of the state of operation of the internal combustion engine 1 in which the load and the rotation speed are intermediate. In this region, the recirculation of exhaust gas is performed by using both the high-pressure EGR device 40 and the low-pressure EGR device 30. A region LPL in FIG. 2 is a region of the state of operation of the internal combustion engine 1 in which the rotation speed and the load are high. In this region, the recirculation of exhaust gas is performed by the low-pressure EGR device 30. In regions that are high in the load and the rotation speed than the region LPL shown in FIG. 2, the recirculation of exhaust gas is not performed.

Thus, by performing the recirculation of exhaust gas by switching between the high-pressure EGR device 40 and the low-pressure EGR device 30 or using both the EGR devices in accordance with the state of operation of the internal combustion engine 1, the recirculation of exhaust gas can be performed over a wide region of operation, and therefore, the amount of NOx emission can be reduced.

Along with the operation of the internal combustion engine 1, the amount of deposit of PM on the filter 13 increases. The PM deposited on the filter 13 is continuously removed by oxidation when the state of operation of the internal combustion engine 1 is a state of operation in which the temperature of exhaust gas becomes high (hereinafter, this process will be referred to as "continuous regeneration").

If the state of operation in which the temperature of exhaust gas is not so high that the continuous regeneration is performed, such as an idling state, a low-speed run, etc., continues for a long time, the amount of deposit of PM on the filter 13 can sometimes increase beyond a permissible limit. Assuming such a situation, a regeneration process of removing the deposit of PM from the filter 13 by oxidation is forcibly executed in this embodiment when the amount of PM deposited on the filter 13 exceeds a predetermined amount. The predetermined amount of PM deposit is an upper limit value of the amount of PM deposit that causes no problem or the like in the operation of the internal combustion engine 1, and is found through experiments beforehand.

In this embodiment, as the regeneration process of the filter 13, the exhaust throttle valve 19 is controlled in the closing direction in comparison with the normal control. This raises the back pressure in the exhaust pipe 4 upstream of the exhaust throttle valve 19 and therefore heightens the load of the internal combustion engine 1, so that the fuel injection amount increases and thus the temperature of exhaust gas from the internal combustion engine 1 rises. Therefore, the temperature of the oxidation catalyst 12 rises, and the oxidation catalyst 12 activates. Then, by addition fuel from the fuel addition valve 17 into exhaust gas, the added fuel undergoes an oxidation reaction on the oxidation catalyst 12, and the reaction heat thereof further raises the temperature of the exhaust gas that flows into the filter 13. Therefore, the oxidation reaction of the PM deposited on the filter 13 is accelerated, and the PM deposited on the filter 13 is removed by oxidation.

Figure 3:
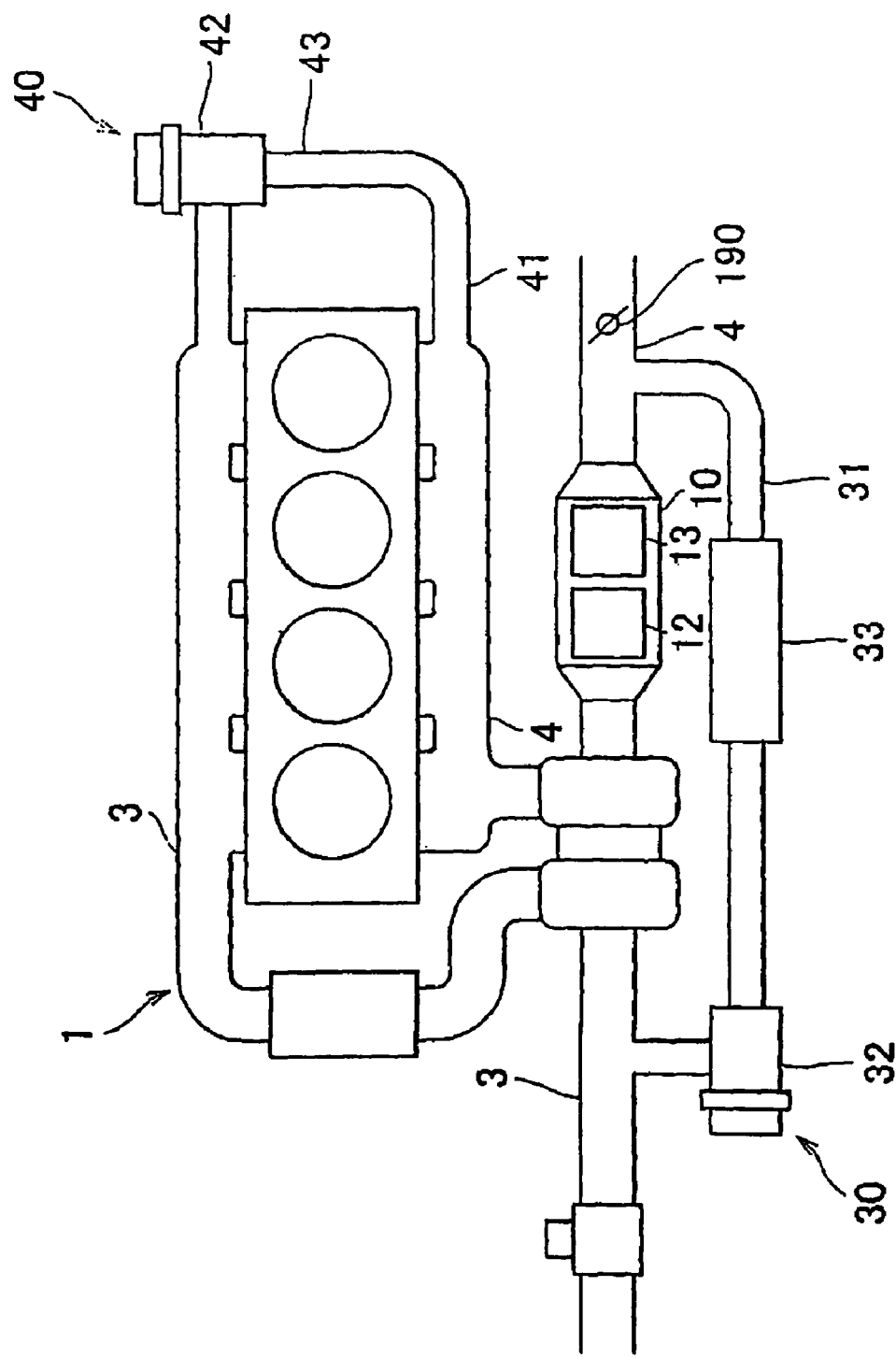
FIG. 3 is a schematic diagram showing a construction of an internal combustion engine and an intake system and an exhaust system thereof to which a related-art exhaust gas recirculation device is applied.

The regeneration process of the filter 13 as described above is performed in the related art as well. However, in a related-art exhaust gas recirculation device of an internal combustion engine as shown in FIG. 3, an exhaust throttle valve 190 is disposed on the exhaust pipe 4 downstream of the site of branching to the low-pressure EGR passage 31. Therefore, when the exhaust throttle valve 190 is controlled in the closing direction in order to carry out the regeneration process of the filter 13, there is a tendency that the back pressure in the exhaust pipe 4 upstream of the exhaust throttle valve 190 rises and, correspondingly, the pressure in the low-pressure EGR passage 31 also rises.

If the pressure in the low-pressure EGR passage 31 becomes high, the accuracy in the adjusting of the low-pressure EGR gas amount by the low-pressure EGR valve 32 declines. Therefore, there is a possibility that the low-pressure EGR gas amount may sometimes become excessively smaller than a target amount and therefore sufficient NOx reducing effect cannot be obtained, or that the low-pressure EGR gas amount may sometimes become excessively larger than the target amount leading to misfire.

In order to avoid such a problem, the related-art technology generally closes the low-pressure EGR valve 32 to stop the recirculation of exhaust gas performed by the low-pressure EGR device 30, during the execution of the regeneration process of the filter 13. Therefore, during this time, the EGR rate may sometimes decline, and the amount of NOx emission may increase.

In the embodiment, however, since the exhaust throttle valve 19 is disposed in the exhaust pipe 4 upstream of the site of branching to the low-pressure EGR passage 31, the rising of the pressure in the low-pressure EGR passage 31 is restrained even when the exhaust throttle valve 19 is controlled in the closing direction in order to execute the regeneration process of the filter 13.

Hence, even during the regeneration process of the filter 13, the decline of the adjusting accuracy of the low-pressure EGR valve 32 is restrained, and therefore the recirculation of exhaust gas by the low-pressure EGR device 30 can be performed. Therefore, even during the regeneration process of the filter 13, the requested EGR gas amount can be recirculated to the intake pipe 3, and the amount of NOx emissions can be suitably reduced.

In the related-art exhaust gas recirculation device constructed as shown in FIG. 3, in some cases where the EGR rate does not reach a target EGR rate although the low-pressure EGR valve 32 is fully open, the exhaust throttle valve 190 is controlled in the closing direction so as to raise the differential pressure between the upstream side and the downstream side of the low-pressure EGR passage 31, so that the low-pressure EGR gas amount is increased. In this case, the adjusting accuracy of the low-pressure EGR gas amount depends on the accuracy of the control of the degree of opening of the exhaust throttle valve 190. Since the exhaust throttle valve 190 is operated under a high-temperature environment, it is difficult to heighten the control accuracy.

In this embodiment, when the low-pressure EGR gas amount is desired to be further increased in a situation where the low-pressure EGR valve 32 is fully opened, the first intake throttle valve 6 is controlled in the closing direction to raise the differential pressure between the upstream side and the downstream side of the low-pressure EGR passage 31. In this case, since the first intake throttle valve 6 operates under a low-temperature environment, the control of the degree of opening can be performed with high accuracy.

Figure 4:
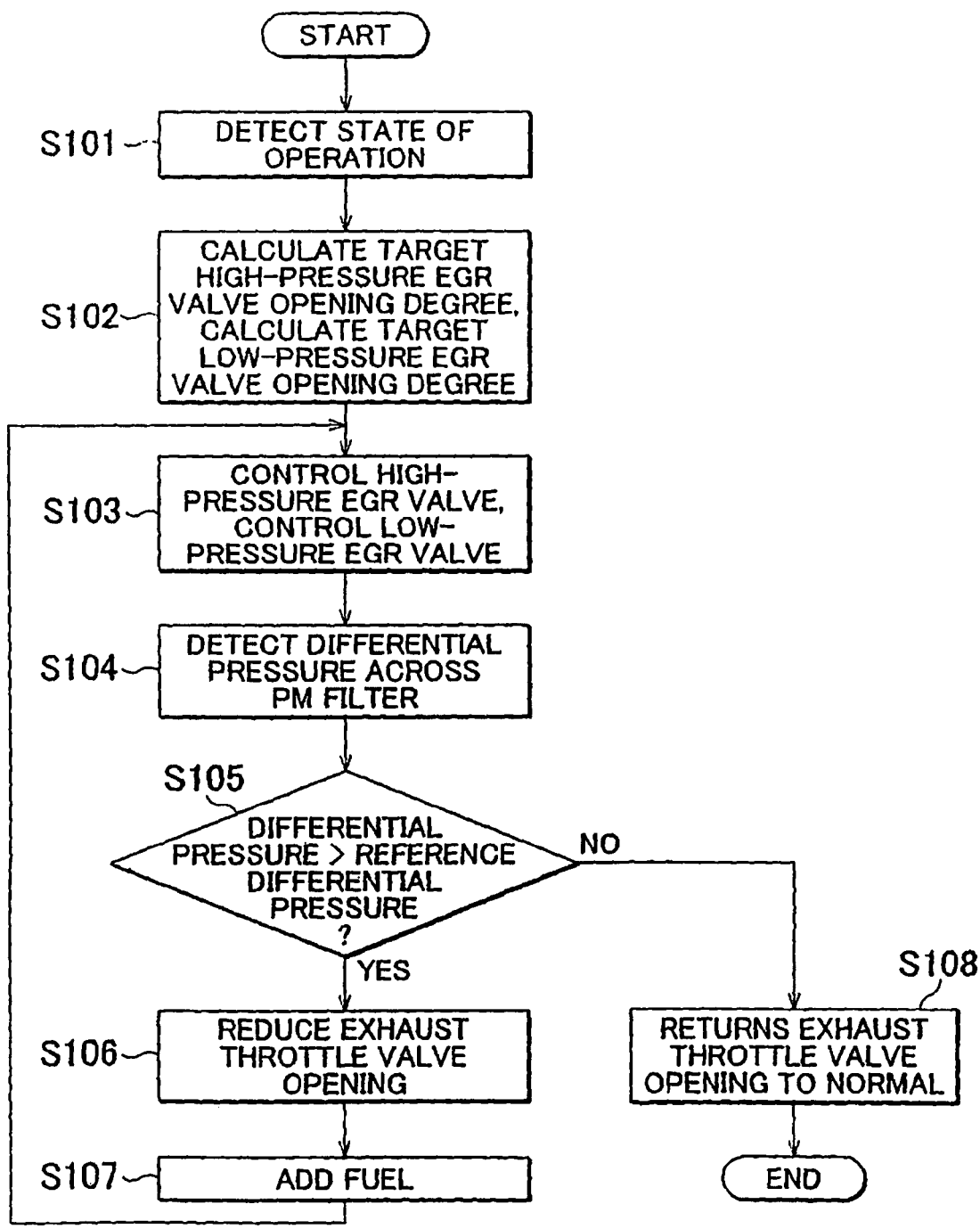
FIG. 4 is a flowchart showing a routine of the regeneration process of a particulate filter and the control of the degree of opening of a low-pressure EGR valve and a high-pressure EGR valve in accordance with the embodiment.

A control routine of performing the control of the degree of openings of the low-pressure EGR valve 32 and the high-pressure EGR valve 42 and performing the regeneration process of the filter 13 will be described. FIG. 4 is a flowchart showing the control routine. This routine is executed repeatedly at every predetermined time.

In step S101, the ECU 20 detects the state of operation of the internal combustion engine 1: Concretely, the ECU 20 detects the engine load of the internal combustion engine 1 on the basis of the value detected by the accelerator operation amount sensor 15, and inputs the engine rotation speed of the internal combustion engine 1 on the basis of the value detected by the crank position sensor 16.

Subsequently in step S102, the ECU 20 finds a target high-pressure EGR valve opening degree and a target low-pressure EGR valve opening degree corresponding to the state of operation of the internal combustion engine 1 detected in step S101. The target high-pressure EGR valve opening degree and the target low-pressure EGR valve opening degree are respectively found through experiments beforehand as functions or maps that are determined in accordance with the engine load and the engine rotation speed of the internal combustion engine 1.

Subsequently in step S103, the ECU 20 controls the high-pressure EGR valve 42 so that the degree of opening of the high-pressure EGR valve 42 becomes equal to the target high-pressure EGR valve opening degree found in step S102, and controls the low-pressure EGR valve 32 so that the degree of opening of the low-pressure EGR valve 32 becomes equal to the target low-pressure EGR valve opening degree found in step S102.

Subsequently in step S104, the ECU 20 inputs the value detected by the differential pressure sensor 11, and measures the differential pressure across the filter 13.

Subsequently in step S105, the ECU 20 determines whether or not the differential pressure across the filter 13 detected in step S104 is greater than a predetermined reference differential pressure. The predetermined reference differential pressure is a differential pressure across the filter 13 which corresponds to the above-described predetermined amount of PM deposit (the permissible limit of the amount of PM deposit).

If an affirmative determination is made in step S105, the ECU 20 determines that PM has deposited on the filter 13 beyond the permissible limit, and proceeds to step S106 in order to perform the regeneration process of the filter 13. On the other hand, if a negative determination is made in step S105, the ECU 20 proceeds to step S108.

In step S106, the ECU 20 controls the exhaust throttle valve 19 in the closing direction. This raises the back pressure in the exhaust pipe 4 and therefore increases the load of the internal combustion engine 1, so that the temperature of the exhaust gas from the internal combustion engine 1 rises. As a result, the temperature of the oxidation catalyst 12 rises. Hence, in step S107, following step S106, the ECU 20 adds fuel from the fuel addition valve 17, so that the added fuel undergoes an oxidation reaction on the oxidation catalyst 12. Due to the reaction heat thereof, the temperature of the exhaust gas that flows into the filter 13 is raised. Therefore, the oxidation reaction of the PM deposited on the filter 13 is accelerated, and the PM deposited on the filter 13 is removed by oxidation.

Next, the ECU 20 returns to step S104, in which the ECU 20 measures the differential pressure across the filter 13 again. If it is subsequently determined in step 105 that the differential pressure across the filter 13 is less than or equal to the reference differential pressure, the ECU 20 determines that the amount of PM deposit on the filter 13 has become less than the permissible limit, and then proceeds to step S108. In step S108, the ECU 20 returns the degree of opening of the exhaust throttle valve 19 to a normal degree of opening. After that, the ECU 20 ends the present execution of the routine.

The foregoing embodiment is a mere example for illustrating the invention, and the foregoing embodiment can be modified in various manners without departing from the spirit of the invention. For example, although the embodiment has been described in conjunction with the case where the exhaust throttle valve 19 is closed in association with the regeneration process of the filter 13, the recirculation of exhaust gas by the low-pressure EGR device 30 can be executed as in a normal operation as described above even in the case where the exhaust throttle valve 19 is closed in association with the warm-up of the oxidation catalyst 12. Therefore, in such cases, too, the amount of production of NOx can be suitably reduced.

Examples of the case where a request to close the exhaust throttle valve 19 is output include a case where, in the exhaust gas recirculation device of an internal combustion engine equipped with an exhaust brake that generates brake force by closing the exhaust throttle valve 19, the exhaust throttle valve 19 is closed in order to operate the exhaust brake.

In the related-art construction (see FIG. 3), if the exhaust throttle valve 190 is closed in order to operate the exhaust brake, the pressure in the low-pressure EGR passage 31 also rises. Therefore, if the low-pressure EGR valve 32 is a valve designed on the assumption that the valve 32 adjusts the amount of low-pressure gas, there is a possibility that exhaust gas may leak from the low-pressure EGR valve 32. If that happens, there is a possibility that the braking capability of the exhaust brake cannot be fully used. According to the embodiment (see FIG. 1), however, the exhaust throttle valve 19 is disposed in the exhaust pipe 4 upstream of the site of connection with the low-pressure EGR passage 31, the occurrence of this problem can be avoided.

This embodiment makes it possible, in the exhaust gas recirculation device having a low-pressure EGR passage, to accomplish the opening degree control of the exhaust throttle valve and the EGR control via the low-pressure EGR passage at the same time while securing good degrees of freedom of the two controls.

The invention claimed is:

1. An exhaust gas recirculation device of an internal combustion engine, the exhaust gas recirculation device comprising:
    a turbocharger having a turbine on an exhaust passage of the internal combustion engine and a compressor on an intake passage of the internal combustion engine;
    a low-pressure EGR passage connecting the exhaust passage downstream of the turbine and the intake passage upstream of the compressor;
    an exhaust throttle valve that is provided on the exhaust passage upstream of a site of connection with the low-pressure EGR passage and that changes a channel cross-sectional area of the exhaust passage;
    an exhaust purification device that is provided in the exhaust passage between downstream of the turbine and upstream of the exhaust throttle valve;
    a low-pressure EGR valve that is provided on the low-pressure EGR passage and that changes the channel cross-sectional area of the low-pressure EGR passage; and
    an EGR control device that controls the low-pressure EGR valve so that an amount of exhaust gas that is recirculated to the intake passage via the low-pressure EGR passage reaches a non-null predetermined target amount,
    wherein the EGR control device controls the low-pressure EGR valve so that the amount of exhaust gas recirculated to the intake passage via the low-pressure EGR passage reaches the predetermined target amount when a degree of opening of the exhaust throttle valve is controlled in a closing direction, whereby exhaust gas is recirculated to the intake passage via the low-pressure EGR passage.

2. The exhaust gas recirculation device according to claim 1, wherein the exhaust purification device has a filter that traps a particulate matter from exhaust gas, the exhaust gas recirculation device further comprising:
    filter regeneration device that controls the degree of opening of the exhaust throttle valve in the closing direction when a regeneration process is performed to remove the particulate matter trapped on the filter by oxidation in comparison with when the regeneration process is not performed,
    wherein the EGR control device controls the low-pressure EGR valve so that the amount of exhaust gas recirculated to the intake passage via the low-pressure EGR passage reaches the predetermined target amount when the regeneration process is performed by the filter regeneration device.

3. The exhaust gas recirculation device according to claim 1, wherein the exhaust purification device has an exhaust purification catalyst, the exhaust gas recirculation device further comprising:

catalyst warm-up device that controls the degree of opening of the exhaust throttle valve in the closing direction when warm-up of the exhaust purification catalyst is performed in comparison with when the warm-up of that is not performed, wherein the EGR control device controls the low-pressure EGR valve so that the amount of exhaust gas recirculated to the intake passage via the low-pressure EGR passage reaches the predetermined target amount when the warm-up is performed by the catalyst warm-up device.

4. The exhaust gas recirculation device according to claim 1, further comprising:

exhaust brake device that controls the degree of opening of the exhaust throttle valve in the closing direction when an exhaust brake is used as an auxiliary brake in comparison with when the exhaust brake is not used, wherein the EGR control device controls the low-pressure EGR valve so that the amount of exhaust gas recirculated to the intake passage via the low-pressure EGR passage reaches the predetermined target amount when the exhaust brake is used by the exhaust brake device.

5. The exhaust gas recirculation device according to claim 1, further comprising:

a first intake throttle valve that is provided on the intake passage upstream of the site of connection with the low-pressure EGR passage and that changes the channel cross-sectional area of the intake passage; and a first intake throttle valve control device that increases a low-pressure EGR gas amount by controlling the first intake throttle valve in the closing direction in a situation where the low-pressure EGR valve is fully open.

6. A control method of the internal combustion engine in conjunction with the exhaust gas recirculation device according to claim 1, the control method comprising:

controlling the low-pressure EGR valve so that the amount of exhaust gas that is recirculated to the intake passage via the low-pressure EGR passage reaches a predetermined non-null target amount when a degree of opening of the exhaust throttle valve is controlled in a closing direction.

7. The control method of the internal combustion engine according to claim 6, wherein if the degree of opening of the exhaust throttle valve is controlled in the closing direction when a regeneration process is performed to remove the particulate matter trapped on a filter in an exhaust purification device by oxidation in comparison with when the regeneration process is not performed, the low-pressure EGR valve is controlled so that the amount of exhaust gas recirculated to the intake passage via the low-pressure EGR passage reaches the predetermined target amount when the regeneration process is performed.

8. The control method of the internal combustion engine according to claim 6, wherein if the degree of opening of the exhaust throttle valve is controlled in a closing direction when a warm-up of an exhaust purification catalyst in an exhaust purification device is performed in comparison with when the warm-up of that is not performed, the low-pressure EGR valve is controlled so that the amount of exhaust gas recirculated to the intake passage via the low-pressure EGR passage reaches the predetermined target amount when the warm-up of that is performed.

9. The control method of the internal combustion engine according to claim 6, wherein if the degree of opening of the exhaust throttle valve is controlled to a closing direction when an exhaust brake is used as an auxiliary brake in comparison with when the exhaust brake is not used, the low-pressure EGR valve is controlled so that the amount of exhaust gas recirculated to the intake passage via the low-pressure EGR passage reaches the predetermined target amount when the exhaust brake is used as the auxiliary brake.

10. The control method of the internal combustion engine according to claim 6, wherein in a situation where the low-pressure EGR valve is fully open, a low-pressure EGR gas amount is increased by controlling a first intake throttle valve that is provided on the intake passage upstream of the site of connection with the low-pressure EGR passage and that changes the channel cross-sectional area of the intake passage so that the first intake throttle valve is controlled in the closing direction.

\* \* \* \* \*